(12) United States Patent
Chang

(10) Patent No.: US 12,020,418 B2
(45) Date of Patent: Jun. 25, 2024

(54) IMAGE PROCESSING METHOD AND SYSTEM, AND NON-TRANSITORY COMPUTER READABLE MEDIUM

(71) Applicant: TAIWAN SEMICONDUCTOR MANUFACTURING COMPANY, LTD., Hsinchu (TW)

(72) Inventor: Chia-Yun Chang, Keelung (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 392 days.

(21) Appl. No.: 17/237,642

(22) Filed: Apr. 22, 2021

(65) Prior Publication Data

US 2022/0343479 A1 Oct. 27, 2022

(51) Int. Cl.
   *G06T 7/00* (2017.01)
(52) U.S. Cl.
   CPC .... *G06T 7/001* (2013.01); *G06T 2207/10061* (2013.01); *G06T 2207/20081* (2013.01); *G06T 2207/30148* (2013.01)
(58) Field of Classification Search
   CPC ........... G06T 7/001; G06T 2207/10061; G06T 2207/20081; G06T 2207/30148; G06T 2207/20084; G06T 7/0004; G06F 18/2431; G06N 3/045
   See application file for complete search history.

(56) References Cited

U.S. PATENT DOCUMENTS

| | | | |
|---|---|---|---|
| 2017/0193680 A1* | 7/2017 | Zhang | G06V 30/2504 |
| 2017/0194126 A1* | 7/2017 | Bhaskar | G06T 7/0004 |
| 2017/0345140 A1* | 11/2017 | Zhang | G06V 10/82 |
| 2018/0330511 A1* | 11/2018 | Ha | G06F 30/00 |
| 2019/0155164 A1* | 5/2019 | Chen | G01N 21/8851 |
| 2021/0343001 A1* | 11/2021 | Grama | G06T 3/4053 |

FOREIGN PATENT DOCUMENTS

CN 110603625 A 12/2019

* cited by examiner

*Primary Examiner* — Samir A Ahmed
(74) *Attorney, Agent, or Firm* — Birch, Stewart, Kolasch & Birch, LLP

(57) ABSTRACT

An image processing method includes: obtaining a defect image of a wafer; processing the defect image to generate a rebuilt image; and when the rebuilt image comprises at least one object pattern, outputting the rebuilt image. The at least one object pattern corresponds to a part of the wafer. A non-transitory computer readable medium and an image processing system are also disclosed herein.

20 Claims, 9 Drawing Sheets

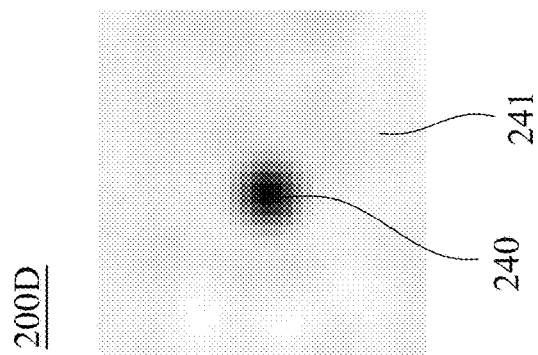
FIG. 2D
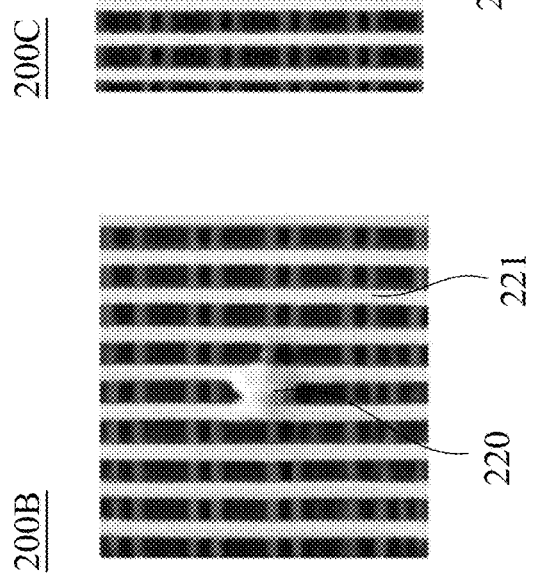
FIG. 2C
FIG. 2B
FIG. 2A

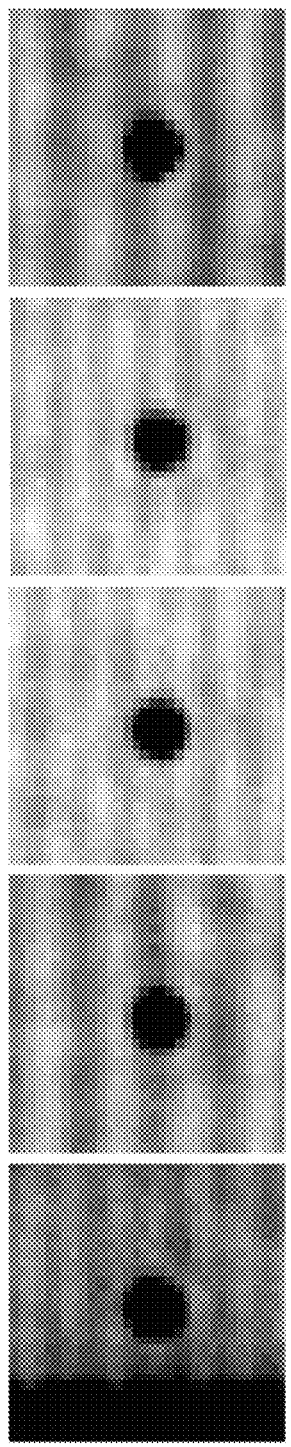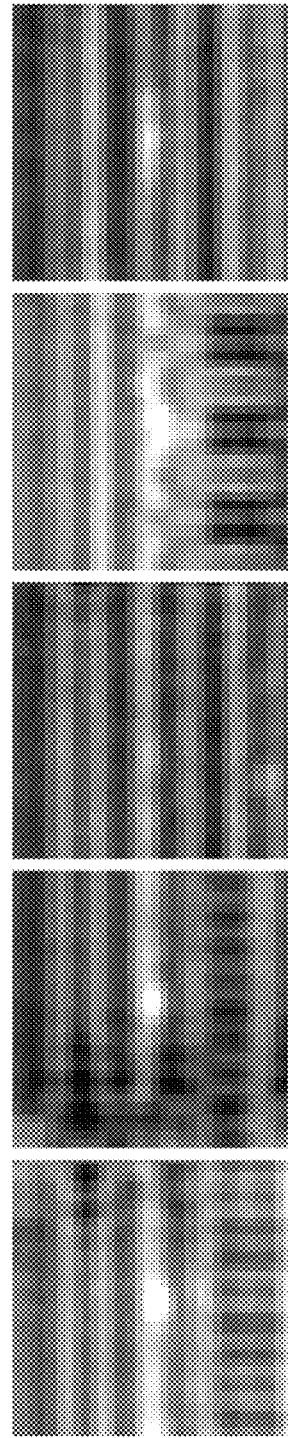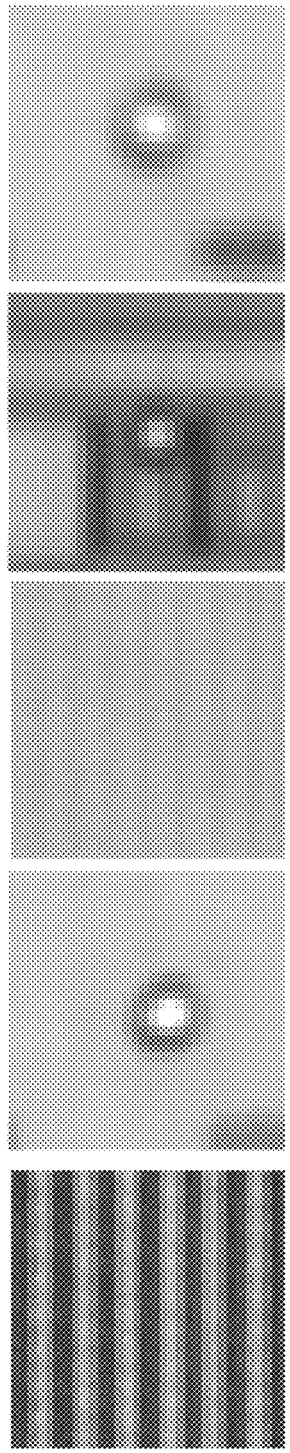

IMAGE PROCESSING METHOD AND SYSTEM, AND NON-TRANSITORY COMPUTER READABLE MEDIUM

BACKGROUND

Optical equipment and electronic microscope are collaborated to be applied to defect review of a semiconductor wafer. Because wafer images captured by the optical equipment are not clear enough and are required to be further reviewed by costing plenty of manpower and time, it affects efficiency of the defect review.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A is a schematic diagram of a defect image corresponding to a defect image in FIG. 1, in accordance with some embodiments of the present disclosure.

FIG. 2B is a schematic diagram of a rebuilt image corresponding to a rebuilt image in FIG. 1, in accordance with some embodiments of the present disclosure.

FIG. 2C is a schematic diagram of a first reference image corresponding to a first reference in FIG. 1, in accordance with some embodiments of the present disclosure.

FIG. 2D is a schematic diagram of a second reference image corresponding to a second reference image in FIG. 1, in accordance with some embodiments of the present disclosure.

FIGS. 8A-8C are schematic diagrams of defect images resulted from an operation corresponding to the operation of classifying in FIG. 7, in accordance with some embodiments of the present disclosure.

DETAILED DESCRIPTION

Figure 1:
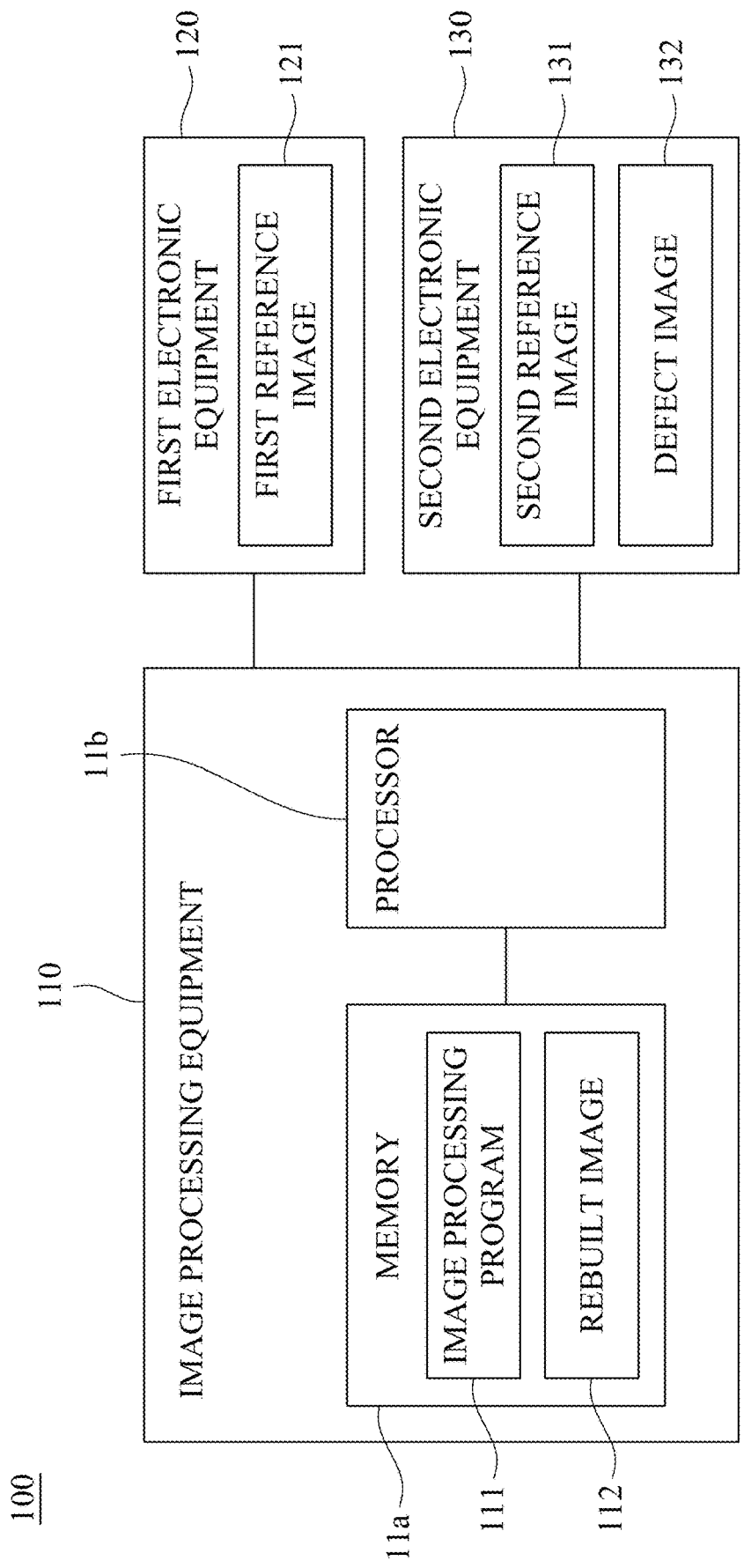
FIG. 1 is a schematic diagram of an image processing system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," or the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

In this document, the term "coupled" may also be termed as "electrically coupled", and the term "connected" may be termed as "electrically connected". "Coupled" and "connected" may also be used to indicate that two or more elements cooperate or interact with each other.

Furthermore, spatially relative terms, such as "underlying," "below," "lower," "overlying," "upper" or the like, may be used throughout the description for ease of understanding to describe one element or feature's relationship to another element(s) or feature(s) as illustrated in the figures. The spatially relative terms are intended to encompass different orientations of the device in use or operation in addition to the orientation depicted in the figures. The structure may be otherwise oriented (e.g., rotated 90 degrees or at other orientations) and the spatially relative descriptors used herein may likewise be interpreted accordingly.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

A semiconductor fabricating method includes wafer fabrication and defect review. In some embodiments, the defect review is configured to capture a wafer, to generate an image of the wafer. In some embodiments, the defect review is further configured to determine that whether the wafer contains any defect, according to this image. A system and a method in some embodiments of the present disclosure are applied to the defect review.

Reference is now made to FIG. 1. FIG. 1 is a schematic diagram of an image processing system 100, in accordance with some embodiments of the present disclosure. The image processing system 100 includes an image processing equipment 110, a first electronic equipment 120 and a second electronic equipment 130. The image processing equipment 110 is coupled to the first electronic equipment 120 and the second electronic equipment 130.

The image processing equipment 110 includes a memory 11$a$ and a processor 11$b$. The memory 11$a$ is coupled to the processor 11$b$. In some embodiments, the memory 11$a$ is configured to store an image processing program 111 and one or more rebuilt images 112. In some embodiments, the memory 11$a$ is a non-transitory computer readable medium, and is configured to store program codes (i.e., executable instructions) (not shown). In various embodiments, the processor 11$b$ is configured to access the image processing program 111 and/or the program codes (not shown) included in the memory 11$a$, for carrying out operations of processing images. In various embodiments, the image processing equipment 110 is implemented by equipment having computing functions. For example, the image processing equipment 110 is implemented by a computer.

The first electronic equipment 120 is configured to generate one or more first reference images 121. In some embodiments, the first electronic equipment 120 is configured to capture the wafer, to generate one or more corresponding photos. In some embodiments, such one or more photos are utilized to train the image processing program 111, and are also referred to as the first reference images 121. In various embodiments, the first electronic equipment 120 is implemented by equipment with utilization of e-beam in imaging. For example, the first electronic equipment 120 is implemented by a scanning electron microscope (SEM).

The second electronic equipment 130 is configured to generate one or more second reference images 131 and one or more defect images 132. In some embodiments, the second electronic equipment 130 is configured to capture the wafer, to generate one or more corresponding photos. In some embodiments, such one or more photos are utilized to train the image processing program 111, and are also referred to as the second reference images 131. In some other embodiments, such one or more photos are configured to be analyzed or processed by the trained image processing program 111, and are also referred to as the defect images 132. In various embodiments, the second electronic equipment 130 is implemented by an optical scanner with various wave lengths.

In some embodiments, the memory 11$a$ is further configured to store the defect images 132 captured by the second electronic equipment 130. In various embodiments, the processor 11$b$ is configured to access the image processing program 111 and the defect images 132 in the memory 11$a$, for carrying out operations of processing images. The operations of processing images are discussed in detailed below at least with reference to FIGS. 3-4.

In some embodiments, the memory 11$a$ is further configured to store the first reference images 121 captured by the first electronic equipment 120, and the second reference images 131 captured by the second electronic equipment 130. In various embodiments, the processor 11$b$ is configured to access the image processing program 111, the first reference images 121 and the second reference images 131 in the memory 11$a$, for carrying out operations of training the image processing program 111. The operations of training the image processing program 111 are discussed in detailed below at least with reference to FIGS. 5A-5B.

The configurations of the image processing system 100 in FIG. 1 as illustrated above are given for illustrative purposes. Various configurations to implement the image processing system 100 in FIG. 1 are within the contemplated scope of the present disclosure. For example, in some embodiments, the image processing equipment 110 and at least one of the first electronic equipment 120 or the second electronic equipment 130 are integrated. In various embodiments, the first electronic equipment 120 is coupled to the second electronic equipment 130.

Reference is now made to FIGS. 2A-2B. FIG. 2A is a schematic diagram of a defect image 200A, in accordance with some embodiments of the present disclosure. In some embodiments, the defect image 200A is an example of the defect images 132 in FIG. 1. FIG. 2B is a schematic diagram of a rebuilt image 200B, in accordance with some embodiments of the present disclosure. In some embodiments, the rebuilt image 200B is an example of the rebuilt images 112 in FIG. 1.

As illustrated in FIG. 2A, in some embodiments, the defect image 200A is an optical image captured with utilization of light beam, and is an image of partial enlargement of one of dies of the wafer. Alternatively stated, with reference to FIGS. 1 and 2A, the defect image 200A is generated by capturing a part of the wafer, by the second electronic equipment 130 (e.g., the optical scanner).

As illustrated in FIG. 2A, the defect image 200A includes a flaw pattern 210 and a background pattern 211. In some embodiments, the flaw pattern 210 corresponds to one part of the wafer, and the background pattern 211 corresponds to another part of the wafer. Specifically, the flaw pattern 210 is one pattern included in the image of the wafer, and is a pattern of the defect of the wafer. The background pattern 211 is one pattern included in the image of the wafer, and is a pattern of the surface of the wafer. The defect of the wafer includes, for example, residue, scratch, crack or the like. The surface of the wafer includes, for example, surface or backside surface of one of the metal layers, surface or backside surface of active regions, electrodes or the like.

As illustrated in FIG. 2B, in some embodiments, the rebuilt image 200B is an image simulated as being captured with utilization of the e-beam, and is an image of partial enlargement of one of dies of the wafer. Alternatively stated, with reference to FIGS. 1 and 2B, the rebuilt image 200B is processed by the image processing program 111.

As illustrated in FIG. 2B, the rebuilt image 200B includes an object pattern 220 and a background pattern 221. In some embodiments, the object pattern 220 corresponds to one part of the wafer. The object pattern 220 and the flaw pattern 210 correspond to the same part of the wafer. Alternatively stated, the object pattern 220 and the flaw pattern 210 are patterns that are the same portion (i.e., the defect) of the wafer. Since the defect image 200A and the rebuilt image 200B are generated by various ways, the object pattern 220 is different from the flaw pattern 210. Therefore, the defect image 200A does not have the object pattern 220, and the rebuilt image 200B does not have the flaw pattern 210.

Similarly, in some embodiments, the background pattern 221 in the rebuilt image 200B corresponds to the background pattern 211 in the defect image 200A. The background pattern 221 and the background pattern 211 correspond to the same part (i.e., the surface) of the wafer, and the background pattern 221 is different from the background pattern 211.

Reference is now made to FIGS. 2C-2D. FIG. 2C is a schematic diagram of a first reference image 200C, in accordance with some embodiments of the present disclosure. In some embodiments, the first reference image 200C is an example of the first reference images 121 in FIG. 1. FIG. 2D is a schematic diagram of a second reference image 200D, in accordance with some embodiments of the present disclosure. In some embodiments, the second reference image 200D is an example of the second reference images 131 in FIG. 1.

As illustrated in FIG. 2C, in some embodiments, the first reference image 200C is associated with the wafer that is captured under a first condition. The first condition indicates that the first reference image 200C is captured with utilization of the e-beam, and indicates that the first reference image 200C is an image of partial enlargement of one of dies of the wafer. Alternatively stated, with reference to FIGS. 1 and 2C, the first reference image 200C is generated by capturing a part of the wafer, by the first electronic equipment 120 (e.g., the SEM) which is referred to as SEM hereinafter. In some embodiments, a method for imaging the first reference image 200C is different from a method for imaging the rebuilt image 200B in FIG. 2B. As discussed above, in some embodiments, the rebuilt image 200B is processed by the image processing program 111.

As illustrated in FIG. 2C, in some embodiments, the first reference image 200C includes a referenced object pattern 230 and a referenced background pattern 231. In some embodiments, the referenced object pattern 230 corresponds to one part of the wafer. The referenced object pattern 230 and the flaw pattern 210 correspond to the same part of the wafer. In some other embodiments, the referenced object pattern 230, the flaw pattern 210 and the object pattern 220 correspond to the same part of the wafer. Alternatively stated, the flaw pattern 210, the object pattern 220 and the referenced object pattern 230 are patterns that are the same portion (i.e., the defect) of the wafer. For example, with reference to FIGS. 1-2C, the flaw pattern 210 corresponds to the defect of the wafer, and is a pattern in an image that is generated by the second electronic equipment 130 (e.g., the optical scanner), which is referred to as optical scanner hereinafter. The referenced object pattern 230 also corresponds to such defect of the wafer, and is a pattern in an image that is generated by the SEM. The object pattern 220 also corresponds to such defect of the wafer, and is a pattern in an image that is simulated by the image processing program 111.

Similarly, in some embodiments, the background pattern 231 in the first reference image 200C and at least one of the background pattern 211 in defect image 200A or the background pattern 221 in rebuilt image 200B correspond to the same part (i.e., the surface) of the wafer.

The second reference image 200D is illustrated in FIG. 2D, and includes a referenced flaw pattern 240 and a referenced background pattern 241. In some embodiments, the second reference image 200D is associated with the wafer that is captured under a second condition. The second condition indicates that the second reference image 200D is captured by the optical scanner, and is an image of partial enlargement of one of dies of the wafer. In some embodiments, the second reference image 200D corresponds to the defect image 200A, which is not discussed in detailed herein.

In some embodiments, the first reference image 200C and the second reference image 200D correspond to the same part of the wafer. Alternatively stated, with reference to FIGS. 2C-2D, the first reference image 200C is generated by capturing a first part of the wafer, by the SEM. The second reference image 200D is generated by capturing the first part of the wafer, by the optical scanner. In various embodiments, the first reference image 200C and the second reference image 200D are referred to as a pair of reference images. In some embodiments, one or more pairs of reference images correspond to one or more parts of the wafer respectively, and are utilized to train the image processing program 111, which is discussed in detailed below with reference to FIGS. 3-5B.

In the defect review, first of all, the optical scanner captures the wafer, to generate a defect map (not shown). The defect map includes a number of patterns each of which is an image corresponding to one part of the wafer. In some embodiments, with reference to FIGS. 1-2A, one magnified pattern in the defect map is the defect image 132 which is illustrated as the defect image 200A.

Moreover, in some embodiments, the patterns in the defect map are images having the flaws, which are determined by the optical scanner. Specifically, the optical scanner compares patterns, corresponding to adjacent dies and/or cells, in the defect map, to determine that which one is different from the others. The pattern that is different from the adjacent others is determined that it has the flaw(s). As a result, the die and/or the cell corresponding to such pattern has the defect(s). In various embodiments, the cells are duplicated portions of the wafer, and are included in at least one of the die.

Subsequently, in the defect review, with reference to FIGS. 1-2B, when the optical scanner generates at least one defect image 132, it needs to further inspect the part of the wafer corresponding to the defect image 132, due to a low resolution of the defect image 132. In some embodiments, the trained image processing program 111 is utilized to process the defect image 132, to generate the rebuilt image 112 which is illustrated as the rebuilt image 200B. Accordingly, the image processing system 100 is configured to determine that whether the part of the wafer actually has the defect(s) and/or to further analyze such defect(s), according to the rebuilt image 112 with a high resolution.

In some embodiments, with reference to FIGS. 2A-2B, the resolution indicates various information including, for example, outline, brightness, contrast, etc. of the flaw pattern 210. In some embodiments, the analyzed defect indicates various information including, for example, category, size, position, etc. of the object pattern 220 that corresponds to such defect.

Figure 3:
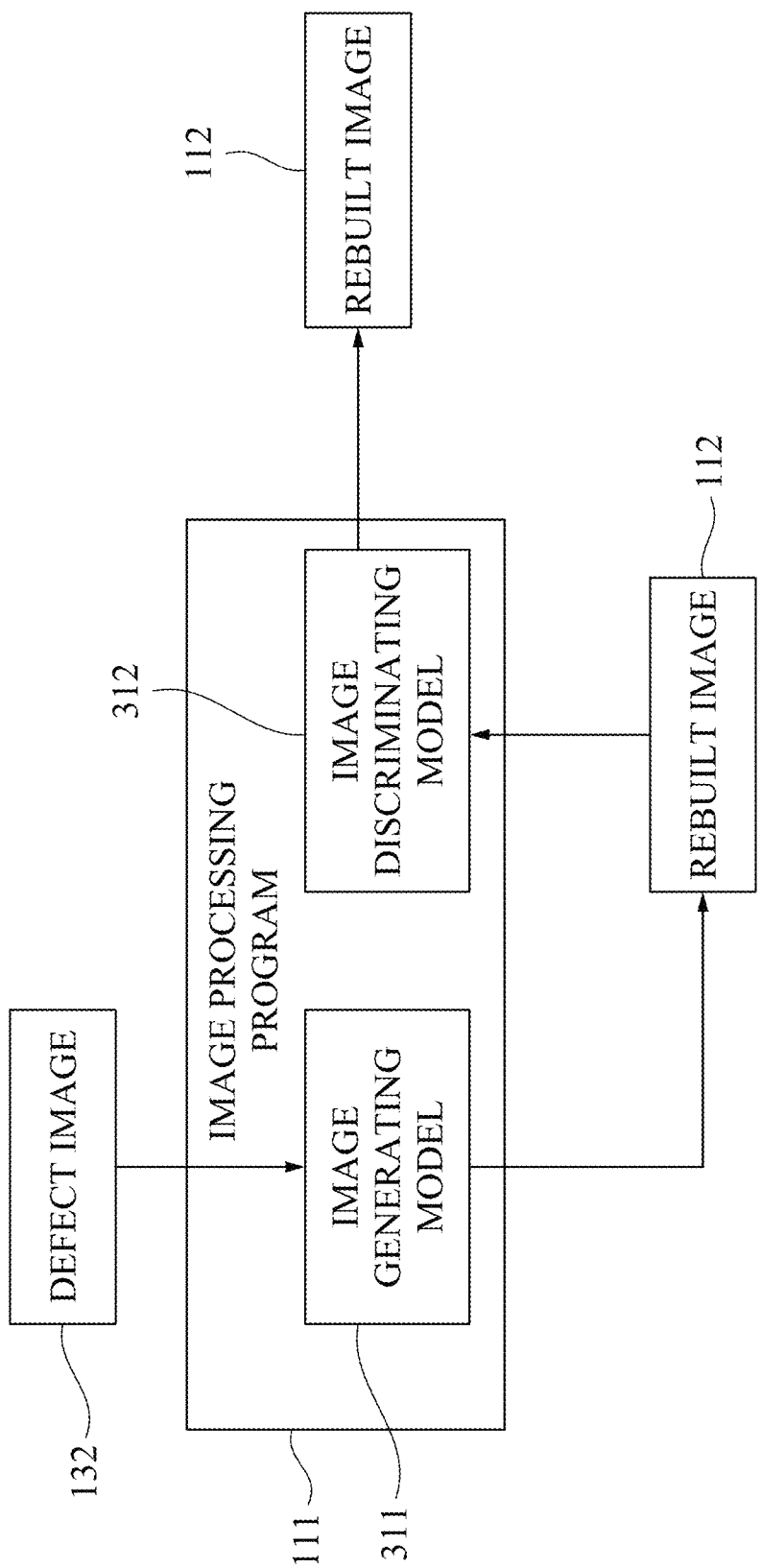
FIG. 3 is a schematic diagram of an image processing program corresponding to an image processing program in FIG. 1, in accordance with some embodiments of the present disclosure.

Reference is now made to FIG. 3. FIG. 3 is a schematic diagram of an image processing program 111, in accordance with some embodiments of the present disclosure. The image processing program 111 in FIG. 3 is an embodiment corresponding to embodiments illustrated in FIG. 1. For simplicity of illustration, the image processing program 111 with respect to the embodiments of FIG. 1, like elements in FIG. 3 are designated with the same reference numbers for ease of understanding. The embodiments with respect to FIG. 3 are discussed with reference to the image processing system 100 in FIG. 1, to illustrate configurations and operations of the image processing program 111.

As illustrated in FIG. 3, the image processing program 111 includes an image generating model 311 and an image discriminating model 312. In some embodiments, the image generating model 311 is a computing program which is implemented based on a machining learning model. The machining learning model is based on an unsupervised learning method. In various embodiments, the image processing program 111 is based on a generative adversarial network (GAN) model. In some embodiments, the image generating model 311 is referred to as a generator, and the image discriminating model 312 is referred to as a discriminator.

In some embodiments, the image generating model 311 includes an encoder and a decoder. In some other embodiments, the image generating model 311 includes a convolution network and a deconvolution network. The convolution network is configured to extract pattern feature of an input image (e.g., the defect image 132). The deconvolution network is configured to generate images repeatedly according to the extracted pattern features, to rebuild an output image (e.g., the rebuilt image 112) with the pattern feature.

In some embodiments, the image discriminating model 312 includes a convolution network. The convolution network is configured to determine that whether the output image (e.g., the rebuilt image 112) contains the pattern features corresponding to the wafer defect. In some other embodiments, the convolution network includes at least one convolution layer, at least one pooling layer and at least one fully connected layer. In various embodiments, the convolution layers and the pooling layers are arranged sequentially and coupled to one another sequentially. The last one of the pooling layers is coupled to the fully connected layer. The convolution layers are configured to obtain the pattern features of the input image. The pooling layers are configured to down sample outputs from the convolution layers, to reduce data but keeping the pattern features. The fully connected layer is configured to flatten an output from the pooling layer, to further output a result.

With reference to FIGS. 1-3, the trained image processing program 111 is executed by the processor 11b, and is configured to calculate the defect image 132 and to further output the rebuilt image 112. The operations of training the image processing program 111 which is executed by the processor 11b is discussed below with reference to FIGS. 2A-3.

When the image processing program 111 is executing, the image generating model 311 is configured to generate the rebuilt image 112, according to the input defect image 132. Alternatively stated, the image generating model 311 transfers/converts the defect image 200A into the rebuilt image 200B. In some embodiments, the image generating model 311 is implemented by an image-to-image translation model.

When the rebuilt image 112 is generated, the image discriminating model 312 is configured to determine that whether the rebuilt image 112 includes at least one object pattern. Furthermore, the image discriminating model 312 is further configured to determine that whether the at least one object pattern is associated with a part of the wafer that is captured under a condition.

In some embodiments, the rebuilt image 112 is identical to the rebuilt image 200B illustrated in FIG. 2B. With such configurations, the object pattern is referred to as the object pattern 220, which corresponds to the defect of the wafer. In some embodiments, the condition is referred to as the first condition, as discussed above with reference to FIG. 2C. In addition, in some embodiments, the condition is presented as parameters of the object pattern 220. The parameters include, for example, grey levels, outline coefficients or the like. The condition indicates that the object pattern 220 is a pattern that is captured by the SEM.

In some embodiments, with the configurations illustrated in FIG. 3, the image discriminating model 312 is configured to determine that whether the rebuilt image 112 generated by the image generating model 311 is sufficiently similar to an image which is practically captured by the SEM. For illustration, as shown in FIGS. 2A-3, the image discriminating model 312 compares the rebuilt image 200B with the first reference image 200C, to determine that whether the rebuilt image 200B is similar to the first reference image 200C.

When the rebuilt image 112 includes at least one object pattern associated with the part of the wafer that is captured under the condition, the image discriminating model 312 is configured to output the rebuilt image 112. For illustration, as shown in FIGS. 2A-3, the image discriminating model 312 considers that the rebuilt image 200B includes the object pattern 220, and that various parameters of the object pattern 220 are matched to parameters of the image captured by the SEM. Accordingly, the image discriminating model 312 outputs the rebuilt image 112 which is illustrated as the rebuilt image 200B.

In some embodiments, even though the rebuilt image 112 is simulated as being captured by the SEM by the image generating model 311, rather than being actually captured by the SEM, the rebuilt image 112 is sufficiently similar to the image captured by the SEM. For example, with reference to FIGS. 2B-2C, the rebuilt image 112 illustrated as the rebuilt image 200B is sufficiently similar to the first reference image 200C practically captured by the SEM.

For illustration, configurations of the image processing program 111 in FIG. 3 as illustrated above are given for illustrative purposes. Various configurations to implement the image processing program 111 in FIG. 3 are within the contemplated scope of the present disclosure.

Figure 4:
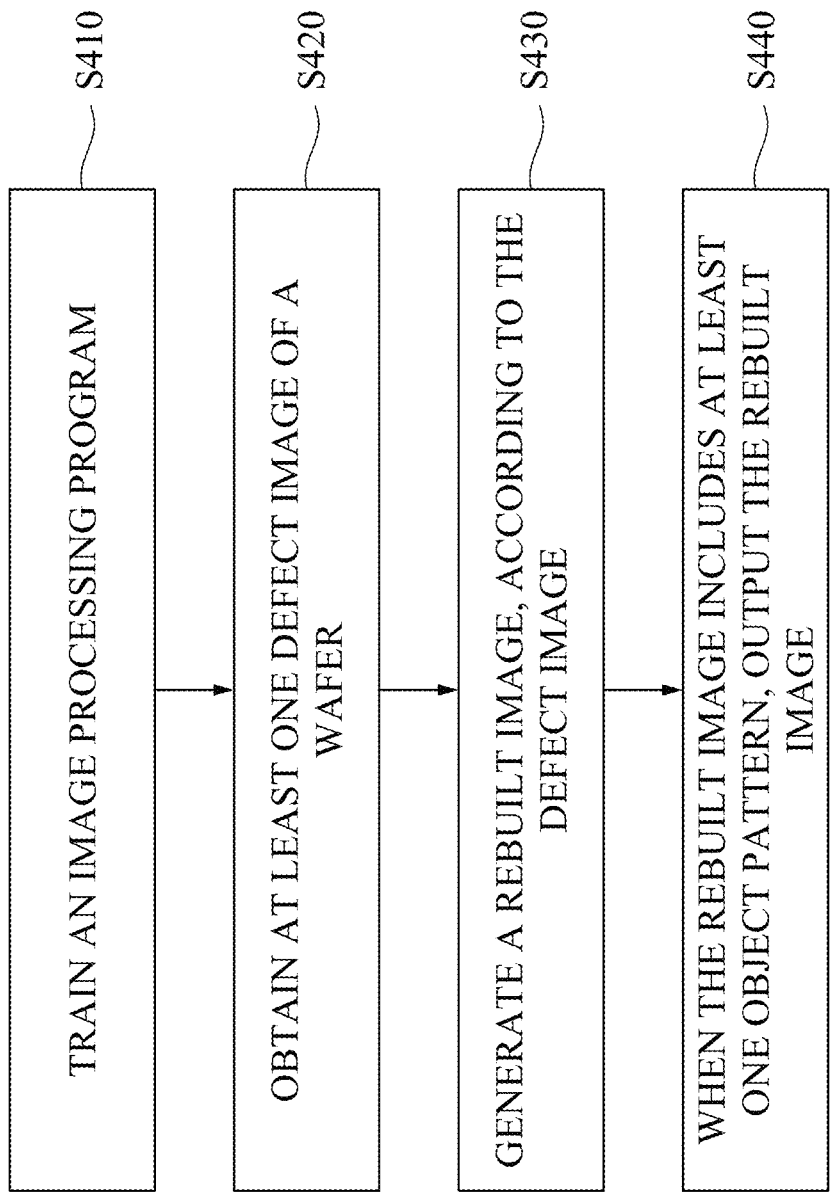
FIG. 4 is a flow chart of an image processing method, in accordance with some embodiments of the present disclosure.

Reference is now made to FIG. 4. FIG. 4 is a flow chart of an image processing method 400, in accordance with some embodiments of the present disclosure. In some embodiments, the image processing method 400 is the flow chart of operating the image processing system 100 in FIG. 1.

As illustrated in FIG. 4, the image processing method 400 includes operations S410, S420, S430 and S440. Following illustrations of the image processing method 400 in FIG. 4 with reference to the image processing system 100 shown in FIG. 1 thereof include exemplary operations. However, the operations in FIG. 4 are not necessarily performed in the order shown. Alternatively stated, operations may be added, replaced, changed order, and/or eliminated as appropriate, in accordance with the spirit and scope of various embodiments of the present disclosure.

In the operation S410, an image processing program is trained by a processor. For illustration, as shown in FIG. 1, the processor 11b operates the executable instructions, to train the image processing program 111. In some embodiments, according to the pair of reference images, which are the first and the second reference images 200C and 200D as discussed with reference to FIGS. 2C-2D, the image processing program 111 calculates the pair of reference images, in order to implement the training as discussed in detailed below with reference to FIGS. 5A-5B.

In the operation S420, at least one defect image of a wafer captured by optical equipment is obtained. For illustration, as shown in FIG. 1, the second electronic equipment 130 captures the wafer, to generate the defect image 132. The processor 11b access the defect image 132. Alternatively stated, with reference to FIG. 2A, the defect image 200A of the wafer captured by the optical scanner is obtained.

In the operation S430, a rebuilt image is generated, according to the defect image, with a utilization of the trained image processing program. For illustration, as shown in FIGS. 1 and 3, the processor 11b accesses the image processing program 111 and the defect image 132. In addition, the processor 11b operates the executable instructions, to make the image generating model 311 of the trained image processing program 111 process the defect image 132, for generating the rebuilt image 112. Alternatively stated, with reference to FIGS. 2A-3, when the image processing program 111 is executing, the image generating model 311 transfers the defect image 200A into the rebuilt image 200B.

In some embodiments, the operation S430 further includes the following operations. With the utilization of the trained image processing program, it is determined that whether rebuilt image includes at least one object pattern corresponding to the wafer, according to at least one reference image. For illustration, as shown in FIGS. 1 and 3, the processor 11b accesses the image processing program 111. In addition, the processor 11b operates the executable instructions, to make the image discriminating model 312 of the trained image processing program 111 determine that whether the rebuilt image 112 (i.e., the rebuilt image 200B) includes the object pattern 220 in FIG. 2B or the object pattern 230 in FIG. 2C, compared to the first reference image 121 (i.e., the first reference image 200C). Alternatively stated, with reference to FIGS. 2A-3, the trained image discriminating model 312 determines that whether the rebuilt image 200B is sufficiently similar to the first reference image 200C, according to the first reference image 200C. In various embodiments, the trained image discriminating model 312 compares the rebuilt image 112 with the first reference image 121, to determine that whether the rebuilt image 112 is generated by the SEM.

In the operation S440, when the rebuilt image includes the at least one object pattern, the rebuilt image is output, with the utilization of the trained image processing program. For illustration, as shown in FIGS. 1 and 3, the processor 11b accesses the image processing program 111. In addition, the processor 11b operates the executable instructions, to make the image discriminating model 312 of the trained image processing program 111 process the rebuilt image 112. When the image discriminating model 312 determines that the rebuilt image 112 includes at least one object pattern 220 in FIG. 2B, the rebuilt image 112 is output. Alternatively stated, with reference to FIGS. 2A-3, the image discriminating model 312 believes that the rebuilt image 200B is generated by the SEM, thereby the rebuilt image 200B being output.

In some approaches, in the defect review, the equipment with utilization of the e-beam in imaging is configured to further inspect the defect image, to determine or analyze the defect of the wafer. Since the equipment with the e-beam (e.g., the SEM) costs plenty of manpower and time to generate an image with higher resolution, it decreases the performance of the defect review. Moreover, since the image captured by the SEM may be unclear including, for example, defocused from the e-beam, mismatched between patterns corresponding to the defect in the SEM image and flaw patterns in the defect image.

Compared to the above approaches, in some embodiments of the present disclosure, with reference to FIG. 1, the processor 11b executes the trained image processing program 111, to automatically inspect the defect images 132. Since the trained image processing program 111 is a processing program, it greatly reduces manpower and time in the defect review. In addition, compared to the above approaches, in the defect review, it generates the defect images 132 excluding defocused images or images having shifted patterns. On the other hand, in some embodiments of the present disclosure, in the defect review, it inspects each one of the defect images 132, removes the operations performed by the SEM, improves inline reviewing wafer per hour (WPH), and reducing issue tool impact cycle time, etc.

Figure 5A:
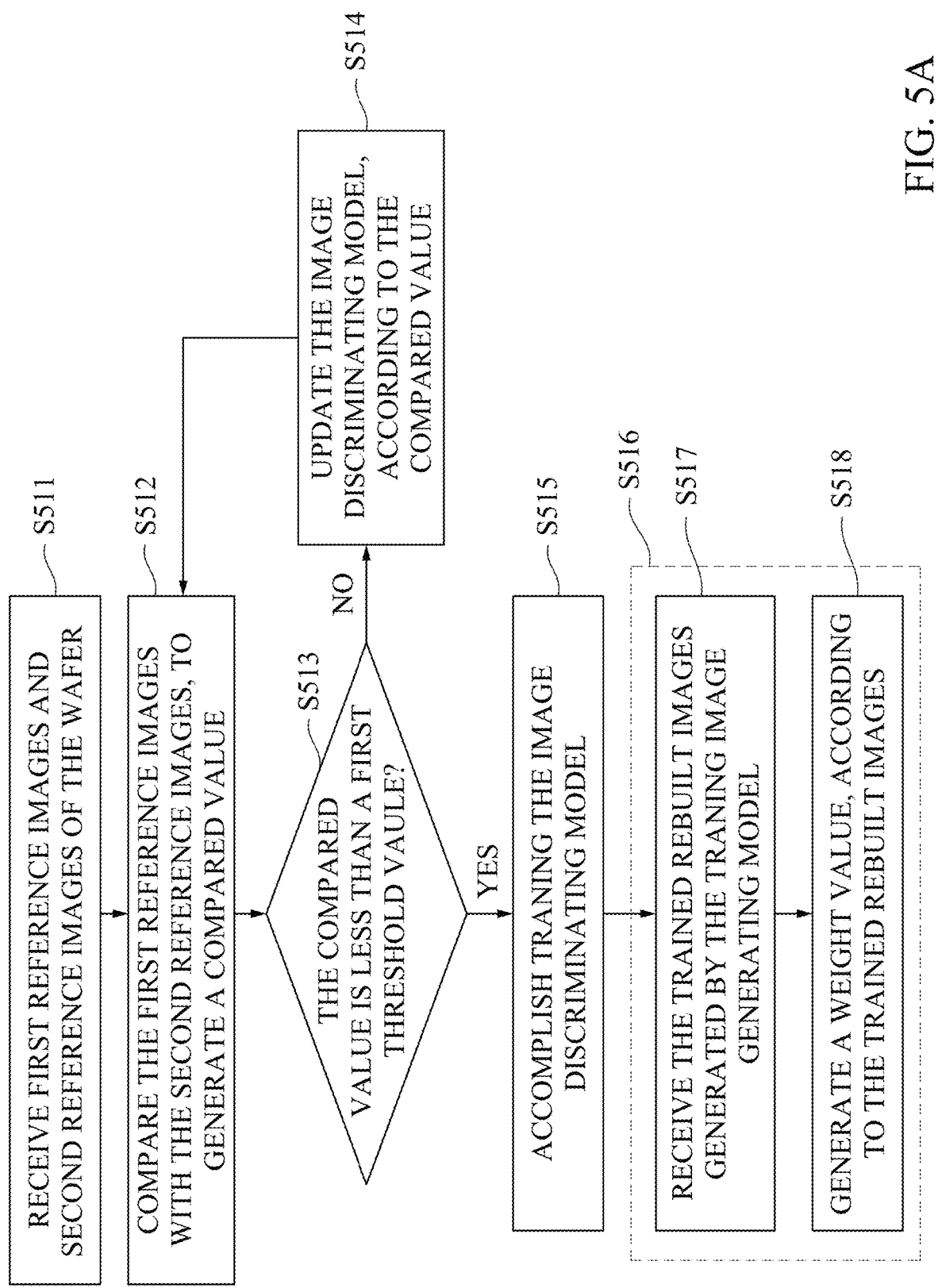
FIGS. 5A-5B are flow charts of methods for training an image processing program, corresponding to the image processing method in FIG. 4, in accordance with some embodiments of the present disclosure.
Figure 5B:
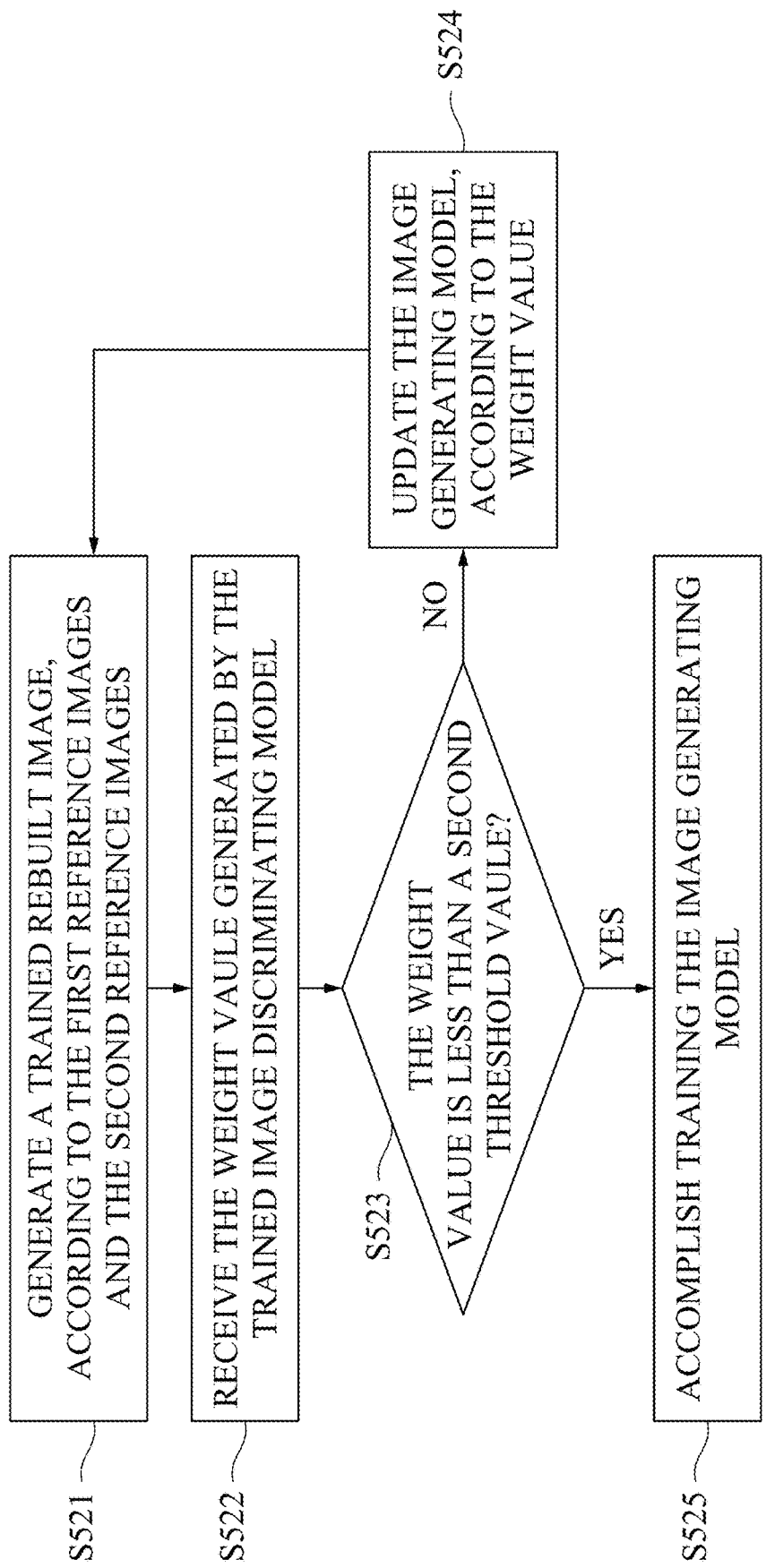

Reference is now made to FIGS. 5A-5B. FIGS. 5A-5B are flow charts of methods 500A and 500B for training an image processing program, corresponding to the image processing method 400 in FIG. 4, in accordance with some embodiments of the present disclosure. Following illustrations of the methods 500A and 500B in FIGS. 5A-5B with reference to the image processing system 100 shown in FIG. 1 and the image processing program 111 shown in FIG. 3 thereof include exemplary operations. However, the operations in FIGS. 5A-5B are not necessarily performed in the order shown. Alternatively stated, operations may be added, replaced, changed order, and/or eliminated as appropriate, in accordance with the spirit and scope of various embodiments of the present disclosure. In various embodiments, the operations in FIGS. 5A-5B are accessed and/or operated by the processor, for example, the processor 11b in FIG. 1, which is not discussed hereinafter.

As illustrated in FIG. 5A, the method 500A for training the image processing program includes operations S511, S512, S513, S514, S515 and S516. In some embodiments, the method 500A is applied to training the image discriminating model 312 in FIG. 3.

In some embodiments, at least one algorithm is applied to training the image discriminating model 312. The algorithm includes, for example, Yolo, single shot multibox detection (SSD), regions with convolutional neural network (R-CNN) or the like.

In the operation S511, the image discriminating model receives first reference images and second reference images. In some embodiments, the first reference images and the second reference images are captured and generated by equipment with utilization of alternative imaging techniques, and are captured at the same position of the wafer. For illustration, as shown in FIG. 1, the image discriminating model 312 receives the first reference images 121 from the first electronic equipment 120 and the second reference images 131 from the second electronic equipment 130. Alternatively stated, with reference to FIGS. 2C-3, the first reference image 200C captured by the SEM and the second reference image 200D captured by the optical scanner are input to the image discriminating model 312. The first reference image 200C and the second reference image 200D are captured at the same part of the wafer.

In the operation S512, the image discriminating model compares the first reference images with the second reference images, to generate compared value(s). In some embodiments, the image discriminating model 312 compares the first reference images with one another, and determines that whether these first reference images are similar to one another, to generate the corresponding compared values. In some other embodiments, the image discriminating model 312 compares the second reference images with one another, and determines that whether these second reference images are similar to one another, to generate the corresponding compared values.

In some embodiments, in the operation S512, the image discriminating model compares two reference images, to determine that whether one of these two reference images includes at least one object pattern. The object pattern is illustrated as the referenced object pattern 230 in FIG. 2C. In some other embodiments, in the operation S512, the image discriminating model 312 compares two reference images, to further determine that whether the object pattern is associated with the wafer that is captured under a condition. In some embodiments, the condition is referred to as the first condition, as discussed above with reference to FIG. 2C. In some embodiments, the condition is presented as parameters of the image, which includes, for example, grey levels, outline coefficients or the like. The condition indicates that the image is captured by the SEM.

In some embodiments, the compared value is one of parameters output from a loss function of the GAN model. In various embodiments, the compared value is configured to determine that whether two images are sufficiently alike to each other. These two images are referred to as one of the first and the second reference images, multiple first reference images, or multiple second reference images. For illustration, as shown in FIG. 1, the image discriminating model 312 compares the first reference image 121 with the second reference image 131, compares the first reference images 121 with one another, and/or compares the second reference images 131 with one another. Alternatively stated, with reference to FIG. 2C-2D, the first reference image 200C and the second reference image 200D are compared to each other, to generate a compared result which indicates that these two images are sufficiently alike. In other embodiments, images (not shown), that are like at least one of the first reference image 200C or the second reference image 200D, are compared to each other, and the compared result is generated accordingly. In some embodiments, the compared result is indicated as an output value of the loss function.

In the operation S513, the image discriminating model determines that whether the compared value is less than a first threshold value, according to the compared value. In some embodiments, the first threshold value is one of the parameters set in the loss function of the GAN model.

When the compared value is not less than the first threshold value, the operation S514 is performed. When the compared value is less than the first threshold value, the operation S515 is performed.

In some embodiments if there are more differences between two images, a value (i.e., the compared value), in the operation S512, output from the loss function is higher. For example, with reference to FIGS. 2A-2D, multiple differences are existed between the first reference image 200C and the second reference image 200D. On the contrary, if there are fewer differences between two images, the value, in the operation S512, output from the loss function is lower. For example, with reference to FIGS. 2A-2D, fewer differences are existed between the first reference image 200C and another image (not shown) that is like the rebuilt image 200B.

In some embodiments, if the first threshold value is set as a lower value, when the compared value is not less than the first threshold value, it indicates that there exists a difference between the two images, and the difference makes these two images be distinguishable. That is, these two images are not sufficiently alike. On the contrary, when the compared value is less than the first threshold value, it indicates that these two images are sufficiently similar to each other.

In the operation S514, when the compared value is greater than or equal to the first threshold value, the image discriminating model is updated/refreshed, according to the compared value. The updated image discriminating model has a better ability to discriminate differences and/or similarities between the two images. The updated image discriminating model is trained continuously, and the operation S512 is performed subsequently.

In the operation S515, when the compared value is less than the first threshold value, training the image discriminating model is accomplished. The training-completed/ended image discriminating model is configured to discriminate that whether two input images are sufficiently similar to each other. For example, with reference to FIGS. 2A-3, the trained image discriminating model 312 is configured to compare one of the input images with the first reference image 200C, to determine that whether such input image and the first reference image 200C are sufficiently alike.

The training-completed image discriminating model is configured to assist training the image generating model, and the operation S516 is operated. The operation S516 includes operations S517 and S518. The embodiments with respect to the operations S517 and S518 are discussed below with reference to FIG. 5B.

As illustrated in FIG. 5B, the method 500B for training the image processing program includes operations S521, S522, S523, S524 and S525. In some embodiments, the method 500B is applied to training the image generating model 311 in FIG. 3.

In some embodiments, at least one algorithm is applied to training the image generating model 311. The algorithm includes, for example, U-net, GAN algorithm, auto encoder algorithm or the like.

In the operation S521, the image generating model receives first reference images and second reference images, and generates a trained rebuilt image, according to the first reference images and the second reference images.

In some embodiments, the first and the second reference images correspond to the first and the second reference images in the operation S511. For illustration, as shown in FIGS. 1 and 3, the image generating model 311 generates a trained rebuilt image (not shown), according to the first reference images 121 and the second reference images 131. Alternatively stated, in some embodiments, with reference to FIGS. 2A-3, the image generating model 311 transfers the second reference image 200D into an image like the defect image 200A or the rebuilt image 200B. In some other embodiments, with reference to FIGS. 2A-3, the image generating model 311 transfers the first reference image 200C into an image like the defect image 200A or the rebuilt image 200B.

Back to the operations S517 and S518 in FIG. 5A.

In the operation S517, the training-completed image discriminating model receives the trained rebuilt image that is generated by the training image generating model in the operation S521.

In the operation S518, the training-completed image discriminating model generates a weight value, according to the trained rebuilt image, to determine that whether the trained rebuilt image output from the image generating model is similar to the first reference image.

In some embodiments, since the training-completed image discriminating model has a function of discriminating between two images as being sufficiently similar to each other or not, the training-completed image discriminating model is configured to compare the trained rebuilt image with the first reference image, to generate a compared result which indicates that these two images are sufficiently alike. In some embodiments, the compared result is indicated as an output value of the loss function, and is also referred to as the weight value. Alternatively stated, with reference to FIGS. 2A-3, the training-completed image discriminating model 312 compares the trained rebuilt image with the first reference image 200C, to determine that whether these two images are alike, which is indicated as the weight value.

Back to the operation S522 in FIG. 5B.

In the operation S522, the image generating model receives the weight value generated by the image discriminating model.

In the operation S523, the image generating model determines that whether the weight value is less than a second threshold value, according to the weight value. In some embodiments, the second threshold value is one of the parameters set in the loss function of the GAN model. In various embodiments, the second threshold value is an alternative embodiment of the first threshold value.

When the weight value is not less than the second threshold value, the operation S524 is performed. When the weight value is less than the second threshold value, the operation S525 is performed.

In some embodiments, if there are more differences between the trained rebuilt image and the first reference image, an output value (i.e., the weight value) in the operation S518 is higher. For example, with reference to FIGS. 2A-2D, multiple differences are existed between the trained rebuilt image which is like the second reference image 200D and the first reference image 200C. Alternatively stated, with reference to FIGS. 2A-3, the training-completed image discriminating model 312 considers that the trained rebuilt image is not sufficiently similar to the first reference image 200C. In another way to explain, the training-completed image discriminating model 312 believes that the trained rebuilt image is not generated by the SEM.

In some embodiments, if there are fewer differences between the trained rebuilt image and the first reference image, an output value (i.e., the weight value) in the operation S518 is lower. For example, with reference to FIGS. 2A-2D, the trained rebuilt image which is like the rebuilt image 200B is similar to the first reference image 200C. Alternatively stated, with reference to FIGS. 2A-3, the training-completed image discriminating model 312 considers that the trained rebuilt image is sufficiently similar to the first reference image 200C. In another way to explain, the training-completed image discriminating model 312 is misled by the image generating model 311, and believes that the trained rebuilt image is generated by the SEM.

In the operation S524, when the weight value is greater than or equal to the second threshold value, the image generating model is updated/refreshed, according to the weight value. The updated image generating model has an ability to transfer the input image into an image that is much more similar to the first reference image, in order to simulate as being captured by the SEM. The updated image generating model is trained continuously, and the operation S522 is performed subsequently.

In the operation S525, when the weight value is less than the second threshold value, training the image generating model is accomplished. The training-completed image generating model is configured to transfer the input image into an image like being captured by the SEM. Such transferred image is configured to make the training-completed image discriminating model consider it is captured by the SEM. For example, with reference to FIGS. 2A-3, the trained image generating model 311 is configured to transfer the input defect image 200A into the rebuilt image 200B. In addition, the trained image discriminating model 312 believes that the rebuilt image 200B is captured by the SEM.

In some embodiments, the methods 500A and 500B are performed N times alternatively. The number N is a positive number. For example, after the operation S525 is performed, the method 500A is subsequently performed for training the image discriminating model which previously completed the training, in order to train the image discriminating model again. In the second times of training the image discriminating model, the first and the second reference images input in the operation S511 are substituted with the trained rebuilt image generated by the trained image generating model. Similarly, after training the image discriminating model at the second times, the method 500B is subsequently performed, in order to train the image generating model again, and so on.

In some embodiments, when the method 500A is performed, the image generating model is regarded as its training being accomplished, and only the image discriminating model is updated. In some other embodiments, when the method 500B is performed, the image discriminating model is regarded as its training being accomplished, and only the image generating model is updated. In various embodiments, if the methods 500A and 500B are performed multiple times, which indicates that N>1, at least one of the first threshold values or the second threshold values are different from one another in the corresponding methods 500A and 500B at every times.

Figure 6:
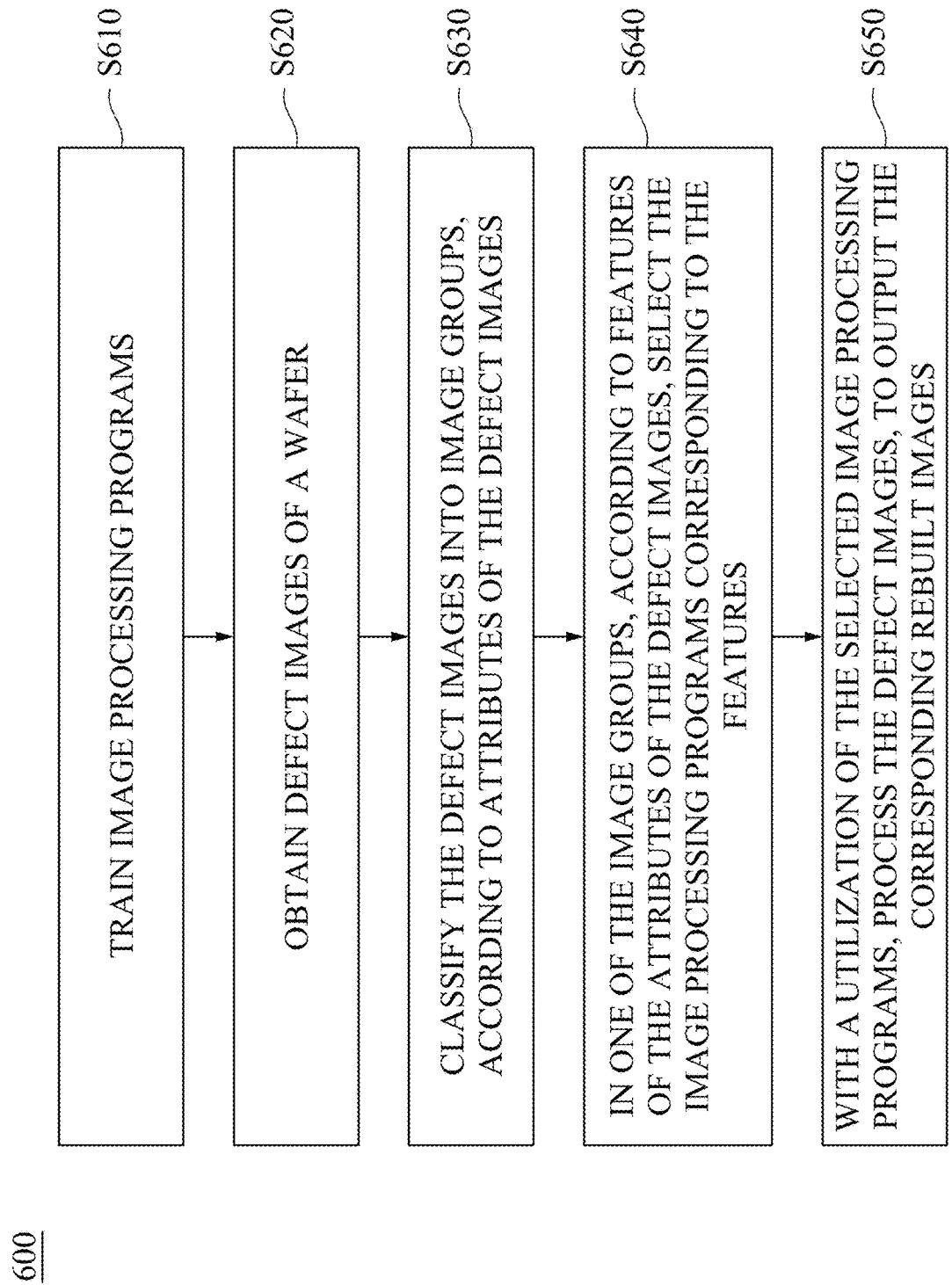
FIG. 6 is a flow chart of an image processing method, in accordance with some embodiments of the present disclosure.
Figure 7:
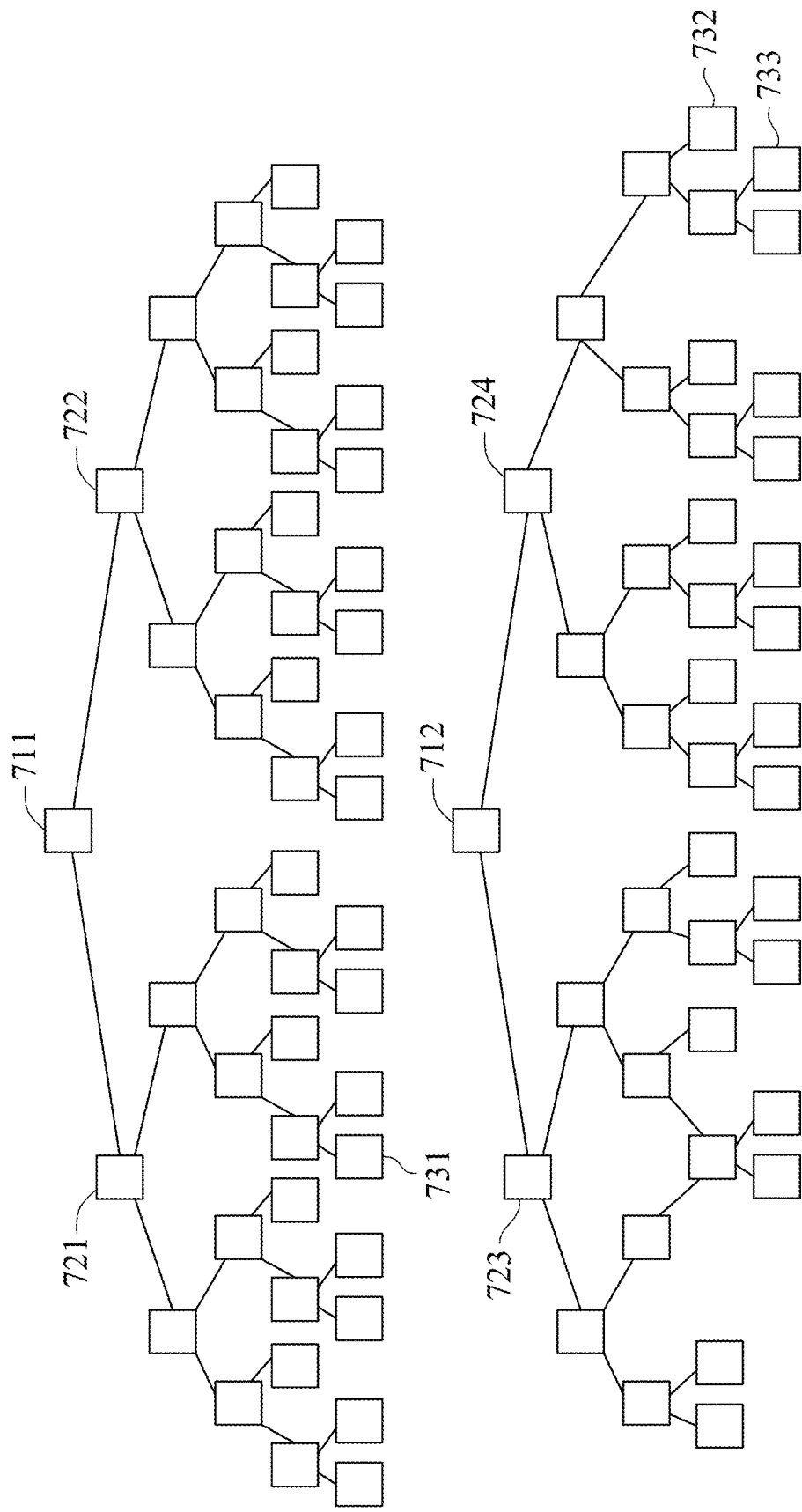
FIG. 7 is a schematic diagram of an operation corresponding to an operation of classifying defect images in the image processing method in FIG. 6, in accordance with some embodiments of the present disclosure.

Reference is now made to FIGS. 6-7. FIG. 6 is a flow chart of an image processing method 600, in accordance with some embodiments of the present disclosure. In some embodiments, the image processing method 600 is the flow chart of operating the image processing system 100 in FIG. 1. In various embodiments, the image processing method 600 is an alternative embodiment of the image processing method 400 in FIG. 4. FIG. 7 is a schematic diagram of an operation corresponding to an operation of classifying defect images in the image processing method in FIG. 6, in accordance with some embodiments of the present disclosure.

As illustrated in FIG. 6, the image processing method 600 includes operations S610, S620, S630, S640 and S650. Following illustrations of the image processing method 600 in FIG. 6 with reference to the image processing system 100 shown in FIG. 1 thereof include exemplary operations. However, the operations in FIG. 6 are not necessarily performed in the order shown. Alternatively stated, operations may be added, replaced, changed order, and/or eliminated as appropriate, in accordance with the spirit and scope of various embodiments of the present disclosure.

In the operation S610, image processing programs are trained by a processor. In some embodiments, the operation S610 corresponds to the operation S410 in FIG. 4, which is not discussed herein.

In the operation S620, defect images of a wafer captured by optical equipment are obtained. In some embodiments, the operation S620 corresponds to the operation S420 in FIG. 4, which is not discussed herein.

In the operation S630, the defect images are classified into image groups by the processor, according to attributes of the defect images. For illustration, as shown in FIG. 1, the defect images 132 are input to the memory 11*a* of the image processing equipment 110. The processor 11b operates the executable instructions, to separate the defect images 132 into groups, according to the attributes of the defect images 132 corresponding to the wafer.

In some embodiments, for the image processing equipment 110, the defect images 132 are also referred to as input images. In various embodiments, the attributes are referred to as circuit attributes of parts of the wafer corresponding to the defect images 132. For instance, the parts of the wafer belong to what kind of circuit types including, for example, memory circuit, other logic circuit, or the like. Alternatively stated, with reference to FIG. 7, the defect images are classified into a first image group indicated as a block 711 and a second image group indicated as a block 712. The first image group (i.e., the block 711) includes the defect images 132 which belong to the memory circuit. The second image group (i.e., the block 712) includes the defect images 132 which belong to the logic circuit.

In some embodiments, the operation S630 further includes the following operations. In each one of the image groups, the corresponding defect images are classified one-by-one, according to features of the attributes of the defect images. For illustration, as shown in FIGS. 1 and 7, the processor 11b operates the executable instructions, to classify, in the first image group (i.e., the block 711), the defect images 132 into image sub-groups, according to the features of the defect images 132. The image sub-groups are indicated as other blocks including, for example, the blocks 721 and 722. In addition, in the image sub-groups (i.e., the blocks 721 and 722), the defect images 132 are continuously classified into other branches of the image groups, according to the features of these corresponding defect images 132. The branches of the image groups are indicated as other blocks including, for example, the block 731.

In some embodiments, the features of the defect image include optical parameters of the defect image. The optical parameters include, for example, polarities, brightness, contrast or the like. In some embodiments, the features of the defect image include pattern parameters of the flaw pattern and the background pattern in the defect image. The pattern parameters include, for example, area ratio, eccentricity, relative positions or the like.

In some embodiments, the first and the second image groups (i.e., the blocks 711 and 712) are classified into branches of the image groups with various features correspondingly. For instance, with reference to FIG. 7, one image group (i.e., the block 731) of the first image group (i.e., the block 711) has the attributes and the features including, for example, the memory circuit, the polarity being higher than a first reference value, the shape of the flaw pattern being like a circle, or the like. One image group (i.e., the block 732 or 733) of the second image group (i.e., the block 712) has the attributes and the features including, for example, the power supply circuit, the brightness being in a range of a second reference value and a third reference value, or the like.

In some embodiments, in the operation S630, a number of the classifying by the attributes and the features of the defect images is more than four times, thereby the image groups with similar properties being obtained, in order to perform the subsequent operations. In some embodiments, in the operation S630, a number of the classifying by the attributes and the features of the defect images is less than seven times, thereby the image groups with similar properties being obtained efficiently, in order to perform the subsequent operations.

In some embodiments, the operation S610 is performed after the operation S630.

In some embodiments, the operation S630 further includes the following operations. After the defect images are classified into the image groups, the processor operates the executable instructions, to train the image processing program, according to the defect images and the corresponding SEM images in each one of the image groups. Alternatively stated, for each one of the image groups, the defect images with the same attributes and the features, and the corresponding images captured by the SEM, are regarded as the pairs of reference images. The image processing program calculates the pairs of reference images, in order to implement the training. Therefore, the trained image processing program performs the operations of processing the defect images in such image group. In various embodiments, with such configurations, the image processing system includes a plurality of image processing programs, and these image processing programs are configured to process the defect images in the various image groups respectively. For illustration, as shown in FIG. 1, the image processing system 100 includes a plurality of image processing programs 111, and the image processing programs 111 respectively correspond to the defect images 132 having alternative attributes and features.

In the operation S640, in one of the image groups, according to the features of the attributes of the defect images, the image processing programs corresponding to the features of the defect images are selected by the processor. For illustration, as shown in FIGS. 1 and 7, the processor 11b accesses the one of the first image group (i.e., the block 711), and operates the executable instructions, to select the defect images 132 (i.e., the block 731) having features and one of the image processing programs 111 corresponding to the features, according to the features of the defect images 132 in such image group (i.e., the block 711).

In the operation S650, with a utilization of the selected image processing programs, the defect images are processed by the processor, to output the corresponding rebuilt images. For illustration, as shown in FIGS. 1 and 7, if the processor 11b selects the image processing program 111 corresponding to the block 731 in the operation S640, the processor 11b operates the executable instructions, to access the image processing program 111, to process the defect images 132 in the block 731, and to output the corresponding rebuilt images 112.

In some embodiments, the operation S650 corresponds to the operations S430-S440 in FIG. 4, which is not discussed herein.

Reference is now made to FIGS. 8A-8C. FIGS. 8A-8C are schematic diagrams of defect images 800A, 800B and 800C resulted from the operation of the classifying illustrated in FIG. 7, in accordance with some embodiments of the present disclosure. In some embodiments, the defect images 800A, 800B and 800C are examples of the defect images 132 in FIG. 1. In various embodiments, the defect images 800A, 800B and 800C are alternative embodiments of the defect image 200A in FIG. 2A.

As illustrated in FIG. 8A, in some embodiments, the defect image 800A are images corresponding to various parts of the wafer. In various embodiments, the defect image 800A is the defect images in one of the image groups, for example, the image group indicated as the block 731.

In some embodiments, in the defect image 800A, the attributes includes the circuit type which belongs to the logic circuit. The features include flaw patterns which are dark in the bright and have lower polarity.

As illustrated in FIG. 8B, in some embodiments, the defect image 800B is an alternative embodiment of the defect image 800A. In various embodiments, the defect image 800B is the defect images in one of the image groups, for example, the image group indicated as the block 732.

In some embodiments, in the defect image 800B, the attributes includes the circuit type which belongs to the memory circuit. The features include flaw patterns which are bright in the dark and are located behind the background patterns.

As illustrated in FIG. 8C, in some embodiments, the defect image 800C is an alternative embodiment of the defect image 800A or 800B. In various embodiments, the defect image 800C is the defect images in one of the image groups, for example, the image group indicated as the block 733.

In some embodiments, in the defect image 800B, the attributes includes the circuit type which belongs to the logic circuit. The features include flaw patterns which are all-bright and have higher polarity.

In some embodiments, an image processing method is disclosed and includes the following operations: obtaining a defect image of a wafer; processing the defect image to generate a rebuilt image; and when the rebuilt image includes at least one object pattern, outputting the rebuilt image. The at least one object pattern corresponds to a part of the wafer.

In some embodiments, the image processing method further includes the following operations: training an image processing program, by utilizing a plurality of reference images. The trained image processing program is configured to process the defect image without the at least one object pattern, to generate and output the rebuilt image.

In some embodiments, the plurality of reference images correspond to parts of the wafer. The plurality of reference images includes a plurality of first reference images and a plurality of second reference images. The plurality of first reference images and the rebuilt image are associated with the wafer that is captured under a first condition. The plurality of second reference images and the defect image are associated with the wafer that is captured under a second condition different from the first condition.

In some embodiments, the image processing method further includes the following operations: training an image generating model, by utilizing a plurality of reference images. The plurality of reference images correspond to parts of the wafer. The trained image generating model is configured to transfer the defect image to the rebuilt image.

In some embodiments, the image processing method further includes the following operations: capturing the wafer by various electronic equipment, to obtain a plurality of reference images of the wafer; and training an image discriminating model, by utilizing the plurality of reference images. The trained image discriminating model is configured to compare the rebuilt image with the plurality of reference images, to determine that whether the rebuilt image includes the at least one object pattern, and to determine that whether the at least one object pattern is associated with the wafer that is captured under a condition.

In some embodiments, the image processing method further includes the following operations: obtaining a plurality of input images including the defect image; and classifying the plurality of input images into a plurality of image groups, according to attributes of the plurality of input images. The plurality of input images correspond to parts of the wafer.

In some embodiments, the image processing method further includes the following operations: processing the defect image, by selectively utilizing an image processing program that is trained according to at least one attribute of the defect image, to output the rebuilt image. The image processing program is associated with the at least one attribute of the defect image.

Also disclosed is a non-transitory computer readable medium which includes executable instructions for carrying out an image processing method by a processor. The image processing method includes the following operations: capturing a defect image, wherein the defect image includes a flaw pattern corresponding to a wafer; and generating a rebuilt image, according to the defect image and a plurality of first reference images. The rebuilt image includes at least one object pattern corresponding to the wafer, and the plurality of first reference images includes patterns corresponding to the wafer. The at least one object pattern and the flaw pattern correspond to the same part of the wafer, and the at least one object pattern is different from the flaw pattern.

In some embodiments, the image processing method further includes the following operations: training an image generating model, by utilizing the plurality of first reference images and a plurality of second reference images that correspond to the plurality of first reference images. The trained image generating model is configured to transfer the defect image to the rebuilt image.

In some embodiments, the image processing method further includes the following operations: capturing the wafer, by a first electronic equipment, to obtain the plurality of first reference images; and capturing the wafer, by a second electronic equipment, to obtain the plurality of second reference images and the defect image.

In some embodiments, training the image generating model further includes the following operations: generating a plurality of trained rebuilt images, according to the plurality of first reference images and the plurality of second reference images; receiving a plurality of weight values, wherein the plurality of weight values indicate a plurality of compared results between the plurality of trained rebuilt images and the plurality of first reference images; and refreshing the image generating model, according to the plurality of weight values.

In some embodiments, the image processing method further includes the following operations: training an image discriminating model, by utilizing the plurality of first reference images and a plurality of second reference images that correspond to the plurality of first reference images. The trained image discriminating model is configured to generate at least one weight value to an image generating model, to determine that whether at least one image output from the image generating model is similar to the plurality of first reference images.

In some embodiments, training the image discriminating model further includes the following operations: comparing the plurality of first reference images with the plurality of second reference images, to discriminate that the plurality of first reference images are associated with the wafer that is captured under a condition.

In some embodiments, the image processing method further includes the following operations: obtaining a plurality of input images of the wafer captured by an electronic equipment, wherein the plurality of input images include the defect image; and classifying the plurality of input images into a plurality of image groups, according to attributes of the plurality of input images.

In some embodiments, the image processing method further includes the following operations: in each one of the plurality of image groups, selecting a plurality of image generating models and a plurality of image discriminating models that correspond to features of the plurality of input images, according to the features of the plurality of input images, to respectively process the plurality of input images to generate output images. The output images include the rebuilt image.

In some embodiments, the plurality of first reference images include at least one reference object pattern corresponding to the wafer, and the at least one reference object pattern is associated with the at least one object pattern.

Also disclosed is an image processing system which includes a memory and a processor. The memory is configured to store an image processing program. The processor is coupled to the memory. The processor is configured to access the image processing program of the memory, to: train the image processing program, by utilizing a plurality of reference images; and processing a defect image, by the trained image processing program, and to generate and output a rebuilt image. The rebuilt image includes at least one object pattern corresponding to a part of a wafer, and the plurality of reference images include referenced object patterns corresponding to parts of the wafer.

In some embodiments, the image processing program includes an image generating model and an image discriminating model. The processor is further configured to access the image processing program of the memory, to: transfer the defect image to the rebuilt image, by utilizing the image generating model; and to receive the rebuilt image and comparing the rebuilt image with the plurality of reference images, by utilizing the image discriminating model, to determine that whether the at least one object pattern is associated with the wafer that is captured under a condition.

In some embodiments, the processor is further configured to access the image processing program of the memory, to select the trained image processing program corresponding to at least one feature of the defect image, according to the at least one feature of the defect image, and to process the defect image.

In some embodiments, the image processing system further includes a first electronic equipment and a second electronic equipment. The first electronic equipment is coupled to the memory and the processor, and configured to capture the wafer to obtain a first part of the plurality of reference images. The second electronic equipment is coupled to the memory and the processor, and configured to capture the wafer to obtain a second part of the plurality of reference images and the defect image.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image processing method, comprising:
   obtaining a defect image of a wafer;
   extracting first pattern features of the defect image by a first convolution network;
   generating a rebuilt image according to the first pattern features by a deconvolution network;
   obtaining second pattern features of the rebuilt image by a second convolution network;
   determining whether the rebuilt image comprises at least one object pattern corresponding to a wafer defect according to the second pattern features; and
   when the rebuilt image comprising the at least one object pattern is determined, outputting the rebuilt image,
   wherein the at least one object pattern corresponds to a part of the wafer.

2. The image processing method of claim 1, further comprising:
   training an image processing program, by utilizing a plurality of reference images,
   wherein the trained image processing program is configured to process the defect image by the first convolution network and the deconvolution network in the trained image processing program, to generate and output the rebuilt image, and
   the defect image does not have the at least one object pattern.

3. The image processing method of claim 2, wherein the plurality of reference images correspond to parts of the wafer, and comprise:
   a plurality of first reference images, wherein the plurality of first reference images and the rebuilt image are associated with the wafer that is captured under a first condition; and
   a plurality of second reference images, wherein the plurality of second reference images and the defect image are associated with the wafer that is captured under a second condition different from the first condition.

4. The image processing method of claim 1, further comprising:
   training an image generating model, by utilizing a plurality of reference images,
   wherein the plurality of reference images correspond to parts of the wafer, and
   the trained image generating model is configured to transfer the defect image to the rebuilt image.

5. The image processing method of claim 1, further comprising:
   capturing the wafer by various electronic equipment, to obtain a plurality of reference images of the wafer; and
   training an image discriminating model, by utilizing the plurality of reference images,
   wherein the trained image discriminating model is configured to compare the rebuilt image with the plurality of reference images, to determine that whether the rebuilt image comprises the at least one object pattern, and to determine that whether the at least one object pattern is associated with the wafer that is captured under a condition.

6. The image processing method of claim 1, further comprising:
   obtaining a plurality of input images comprising the defect image; and
   classifying the plurality of input images into a plurality of image groups, according to attributes of the plurality of input images,
   wherein the plurality of input images correspond to parts of the wafer.

7. The image processing method of claim 1, further comprising:

processing the defect image, by selectively utilizing an image processing program that is trained according to at least one attribute of the defect image, to output the rebuilt image, wherein the image processing program is associated with the at least one attribute of the defect image.

8. A non-transitory computer readable medium, comprising executable instructions for carrying out an image processing method by a processor, the image processing method comprising:

capturing a defect image, wherein the defect image comprises a flaw pattern corresponding to a wafer; and generating a rebuilt image, according to the defect image and a plurality of first reference images, wherein the rebuilt image comprises at least one object pattern corresponding to the wafer, and the plurality of first reference images comprise patterns corresponding to the wafer, wherein the at least one object pattern and the flaw pattern correspond to the same part of the wafer, and the at least one object pattern is different from the flaw pattern, and generating the rebuilt image comprises extracting pattern features of the defect image by a convolution network and generating the rebuilt image according to the pattern features by a deconvolution network.

9. The non-transitory computer readable medium of claim 8, wherein the image processing method further comprises:

training an image generating model, by utilizing the plurality of first reference images and a plurality of second reference images that correspond to the plurality of first reference images, wherein the trained image generating model is configured to transfer the defect image to the rebuilt image.

10. The non-transitory computer readable medium of claim 9, wherein the image processing method further comprises:

capturing the wafer, by a first electronic equipment, to obtain the plurality of first reference images; and capturing the wafer, by a second electronic equipment, to obtain the plurality of second reference images and the defect image.

11. The non-transitory computer readable medium of claim 9, wherein training the image generating model comprises:

generating a plurality of trained rebuilt images, according to the plurality of first reference images and the plurality of second reference images;

receiving a plurality of weight values, wherein the plurality of weight values indicate a plurality of compared results between the plurality of trained rebuilt images and the plurality of first reference images; and refreshing the image generating model, according to the plurality of weight values.

12. The non-transitory computer readable medium of claim 8, wherein the image processing method further comprises:

training an image discriminating model, by utilizing the plurality of first reference images and a plurality of second reference images that correspond to the plurality of first reference images, wherein the trained image discriminating model is configured to generate at least one weight value to an image generating model, to determine that whether at least one image output from the image generating model is similar to the plurality of first reference images.

13. The non-transitory computer readable medium of claim 12, wherein training the image discriminating model comprises:

comparing the plurality of first reference images with the plurality of second reference images, to discriminate that the plurality of first reference images are associated with the wafer that is captured under a condition.

14. The non-transitory computer readable medium of claim 8, wherein the image processing method further comprises:

obtaining a plurality of input images of the wafer captured by an electronic equipment, wherein the plurality of input images comprise the defect image; and classifying the plurality of input images into a plurality of image groups, according to attributes of the plurality of input images.

15. The non-transitory computer readable medium of claim 14, wherein the image processing method further comprises:

in each one of the plurality of image groups, selecting a plurality of image generating models and a plurality of image discriminating models that correspond to features of the plurality of input images, according to the features of the plurality of input images, to respectively process the plurality of input images to generate output images, wherein the output images comprise the rebuilt image.

16. The non-transitory computer readable medium of claim 8, wherein the plurality of first reference images comprise at least one reference object pattern corresponding to the wafer, and the at least one reference object pattern is associated with the at least one object pattern.

17. An image processing system, comprising:

a memory configured to store an image processing program; and a processor coupled to the memory, wherein the processor is configured to access the image processing program of the memory, to:

train the image processing program, according to a loss function which is generated by comparing a plurality of reference images; and process a defect image, by a convolution network of the trained image processing program, to generate pattern features; and output a rebuilt image according to the pattern features by a deconvolution network, wherein the rebuilt image comprises at least one object pattern corresponding to a part of a wafer, and the plurality of reference images comprise referenced object patterns corresponding to parts of the wafer.

18. The image processing system of claim 17, wherein the image processing program comprises:

an image generating model; and an image discriminating model, wherein the processor is further configured to access the image processing program of the memory, to:

transfer the defect image to the rebuilt image, by utilizing the image generating model; and receive the rebuilt image and comparing the rebuilt image with the plurality of reference images, by utilizing the image discriminating model, to determine that whether the at least one object pattern is associated with the wafer that is captured under a condition.

19. The image processing system of claim 17, wherein the processor is further configured to access the image processing program of the memory, to:

select the trained image processing program corresponding to at least one feature of the defect image, according to the at least one feature of the defect image, to process the defect image.

20. The image processing system of claim 17, further comprising:
a first electronic equipment coupled to the memory and the processor, and configured to capture the wafer to obtain a first part of the plurality of reference images; and
a second electronic equipment coupled to the memory and the processor, and configured to capture the wafer to obtain a second part of the plurality of reference images and the defect image.

* * * * *